United States Patent [19]

Kuester

[11] 4,442,162

[45] Apr. 10, 1984

[54] CHEMICAL AND BIOLOGICAL RESISTANT MATERIAL AND METHOD OF FABRICATING SAME

[75] Inventor: Frank E. Kuester, DeLand, Fla.

[73] Assignee: Brunswick Corporation, Skokie, Ill.

[21] Appl. No.: 309,899

[22] Filed: Oct. 9, 1981

[51] Int. Cl.³ .................... B32B 7/00; B65B 55/00
[52] U.S. Cl. ............................ 428/245; 428/919; 428/265; 428/262; 427/407.1; 427/412
[58] Field of Search ............ 428/245, 246, 250, 262, 428/919, 265, 518; 427/407.1, 412

[56] References Cited

U.S. PATENT DOCUMENTS

| | | |
|---|---|---|
| 2,278,898 | 4/1942 | Schofield . |
| 2,294,875 | 9/1942 | Hexter et al. . |
| 2,339,317 | 1/1944 | Ayers . |
| 2,351,142 | 6/1944 | Mitchell . |
| 2,354,765 | 8/1944 | Meyer et al. . |
| 2,364,289 | 12/1944 | Hale . |
| 2,825,168 | 3/1958 | Ekman . |
| 3,069,796 | 12/1962 | Ruter . |
| 3,119,729 | 1/1964 | Ljungbo . |
| 3,187,331 | 6/1965 | Beller . |
| 3,199,547 | 8/1965 | Knutson et al. . |
| 3,656,987 | 4/1972 | Stewart ................ 428/246 |
| 3,700,397 | 10/1972 | Ramsley et al. . |
| 3,733,606 | 5/1973 | Johansson . |
| 3,967,026 | 6/1976 | Dalblom . |
| 3,977,927 | 8/1976 | Amos et al. . |
| 4,001,827 | 1/1977 | Wallin et al. . |
| 4,064,305 | 12/1977 | Wallin . |

FOREIGN PATENT DOCUMENTS 1404121  8/1975  United Kingdom .

Primary Examiner—Marion McCamish
Assistant Examiner—Beverly Johnson
Attorney, Agent, or Firm—Hosier, Niro & Daleiden

[57] ABSTRACT

A laminated chemical and biological resistant, flexible material is disclosed, along with a process of fabricating the material. A base fabric of woven construction forms a support layer for the material. A thermoplastic base coat is applied and laminated to at least one side of the base fabric. A top camouflage coat is applied and laminated to the base coat, the top coat comprising a thermosetting chemical and biological resistant material. The base fabric may be open-weave and the base coat is adhered thereto by physically filling the interstices of the open-weave. The base fabric may be closed-weave and the base coat includes a bonding agent for adhering to the base fabric. In the preferred embodiment, the base fabric is a polyester or nylon material, the base coat is a polyvinyl chloride material and the top coat is a coating compound from a group consisting of aliphatic polyurethanes, polyvinylidene chloride, butyl rubber, and the like. Alternately, a chemical and biological resistant film barrier may be laminated in the material, the film comprising a compound from a group consisting of nylon, polyethylene terephthalate, polyacrlonitrile, polyvinylidene chloride, and the like.

18 Claims, 6 Drawing Figures

CHEMICAL AND BIOLOGICAL RESISTANT MATERIAL AND METHOD OF FABRICATING SAME

BACKGROUND OF THE INVENTION

This invention relates to flexible camouflage material and, more particularly, to laminated material which is chemical and biological (i.e. CB) resistant, including camouflage material.

There has been a need for chemical and biological resistant fabrics which can be produced to meet requirements for camouflage materials, such as color, gloss, etc. Fabrics meeting these requirements would find utility not only in the production of camouflage screens, but also in protective clothing, tentage, tarpaulin, and like applications.

Such materials or fabrics are in the art of laminations in which the physical properties of coated fabrics are determined by the fabric base, but their chemical resistance is determined by particular coatings of the fabric base. Heretofore, camouflage materials or fabrics have been laminated by using a woven support fabric having polymer films or layers laminated thereto. The polymer films are thermoplastic and, while providing a good material meeting camouflage requirements, they are permeable by chemical agents. The permeation of chemical agents through polymer films has been described as an activated diffusion process. Consequently, known camouflage materials, or laminated fabrics, have not been appropriate for use in chemical and biological resistant applications.

The present invention is directed to solving these problems and fulfilling the need for chemical and biological resistant fabrics, including fabrics which can be produced to meet camouflage material requirements. Many criterion have to be taken into consideration including the weight, breaking strength, tearing strength, stiffness, lamination adhesion, chemical-biological resistance, water vapor transmission rate, aging and the like parameters in order to provide an acceptable material or fabric.

SUMMARY OF THE INVENTION

Accordingly, an object of the present invention is to provide chemical and biological resistant, flexible, coated fabrics, including fabrics having the necessary camouflage properties.

Another object of the present invention is to provide a process of fabricating laminated chemical and biological resistant, camouflage material of the character described.

In the exemplary embodiment of the invention, a laminated chemical and biological resistant, flexible material is provided with a base fabric of woven construction forming a support layer for the material. A base coat is laminated to at least one side of the base fabric. A top coat is laminated to the base coat, the top camouflage coat comprising a chemical and biological resistant camouflage material.

The base fabric may comprise an open-weave construction, and the base coat is adhered to the base fabric by physically filling the interstices of the open-weave. The base fabric may comprise a closed-weave construction, and the base coat includes a bonding agent for adhering the base coat to the base fabric.

In the laminated material of the present invention, the base fabric is a woven polyester or nylon material, the base coat is a thermoplastic material and the top coat is a thermosetting or thermoplastic material which is CB resistant and has the necessary camouflage properties. In the preferred embodiment of the invention, the base coat comprises a polyvinyl chloride material, or the like, and the top coat comprises a coating compound from a group comprising aliphatic polyurethane, polyvinylidene chloride, butyl rubber, and the like.

A process of the present invention comprises fabricating a laminated CB resistant, flexible camouflage material by providing a support layer for the material in the form of a woven polyester or nylon base fabric construction; applying to at least one side of the base fabric a flexible thermoplastic base coat; and applying to the base coat a top camouflage coat of CB resistant thermosetting material, as described above.

Alternately, the top coat may or may not be CB resistant, and CB resistance is attained by placing between the base fabric or base coat and the top coat a CB resistant barrier film on at least one side of the laminated material.

In the alternate form of the invention, the base fabric is of a closed or tight weave and a CB barrier film is bonded either directly to the base fabric or to an intermediate base coat bonded to the fabric. A thermoplastic camouflage coating then is applied directly onto the CB barrier film. The base and top coats are polyvinyl chloride. The barrier film is selected from a group of films which include nylon, polyethylene terephthalate, polyacrylonitrile, polyvinylidene chloride, and the like. This embodiment might be used for such applications as fox hole and cargo cover materials.

Other objects, features and advantages of the invention will be apparent from the following detailed description taken in connection with the accompnaying drawings.

DESCRIPTION OF THE DRAWINGS

The features of this invention which are believed to be novel are set forth with particularity in the appended claims. The invention, together with its objects and the advantages thereof may be best understood by reference to the following description taken in conjunction with the accompanying drawings, in which like reference numerals identify like elements in the figures and in which:

DETAILED DESCRIPTION OF THE INVENTION

Figure 1:
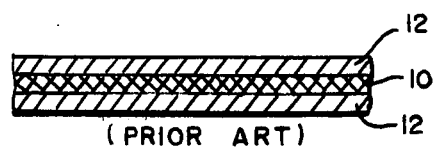
FIG. 1 is a fragmented sectional view, on an enlarged scale, through a known camouflage coated fabric.

Referring to the drawings in greater detail, and first to FIG. 1, a prior art camouflage coated fabric is shown to include an open-weave base fabric 10 to which is laminated, on both sides thereof, layers 12 of camouflage coating. The camouflage coatings normally are of thermoplastic material adhered to base fabric 10. The thermoplastic coatings meet camouflage requirements, but they are permeable to chemical agents by activated diffusion affecting such polymer films.

Figure 2:
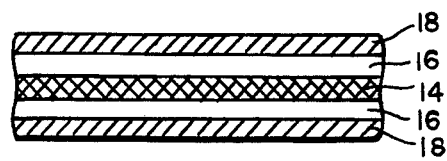
FIG. 2 is a fragmented sectional view, on an enlarged scale, through a chemical-biological resistant camouflage coated fabric of the present invention.

FIG. 2 illustrates a laminated chemical-biological resistant, flexible camouflage material in accordance with the present invention. A base fabric 14 is provided of woven construction forming a support layer for the material. A base coat 16 is laminated to at least one side of base fabric 14. As shown, two base coats 16 are laminated to opposite sides to the base fabrics. A top coat 18 is laminated to each base coat 16 and comprises a CB resistant material which can have camouflage properties.

Base fabric 14 is fabricated of woven polyester or nylon material, base coats 16 are fabricated of thermoplastic material, and top camouflage coats 18 are fabricated of thermosetting material. Preferably, base coats 16 are fabricated of polyvinyl chloride material and top coats 18 are fabricated of a coating compound selected from a group including aliphatic polyurethanes, polyvinylidene chloride, butyl rubber, fluorocarbon polymers, nitrile rubber, and the like.

Figure 3:
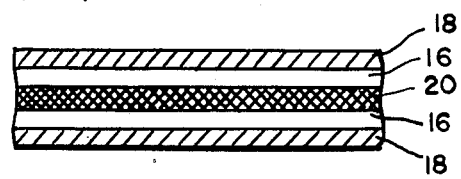
FIG. 3 is a view similar to that of FIG. 2, incorporating a closed-weave base fabric.

Base fabric 14 in FIG. 2 comprises an open-weave construction, and base coats 16, being of thermoplastic material, are adhered to the base fabric by physically filling the interstices of the open-weave. FIG. 3 shows a base fabric 20 which is of a closed-weave construction. With this base fabric, the thermoplastic base coats include a bonding agent for adhering the base coats directly to opposed sides of the base fabric. In either embodiment of FIGS. 2 or 3, top camouflage coats 18 are laminated to the base coats by an appropriate laminating process.

Accordingly, a process of the present invention is provided for fabricating a laminated CB resistant, flexible material, comprising the steps of providing a support layer for the material in the form of a base fabric of woven construction; applying to at least one side of the base fabric a flexible base coat; and applying to the base coat a top coat of CB resistant material which can have camouflage properties. The base fabric may be of an open-weave construction, and the step of applying the base coat comprises adhering a thermoplastic layer to the base fabric by filling the interstices thereof with the thermoplastic material. The base fabric may be of a closed-weave construction, and the step of applying the base coat comprises adhering the base coat to the base fabric by an appropriate bonding agent.

The invention also includes the use of a prefabricated barrier film to provide a fabric with CB resistance. Barrier coatings, such as coatings 18 described above in relation to FIGS. 2 and 3, can be applied as a liquid top coat which can have camouflage properties. The top coat can be converted into a continuous barrier film by a process of fusion, cross-linking, or solvent or water evaporation. On the other hand, the prefabricated barrier film is a solid film incorporated into the laminate.

The liquid coatings would have camouflage color and glass properties, since they would have the proper pigments incorporated into their formulation and since they would be deposited and fused, cross-linked, etc., upon a delustered carrier. The prefabricated barrier films, although pigmented, would be glossy and top coats must be applied.

Figure 4:
FIG. 4 is a fragmented sectional view, on an enlarged scale, through a known material incorporating a chemical-biological resistant barrier film on one side of the material.
Figure 5:
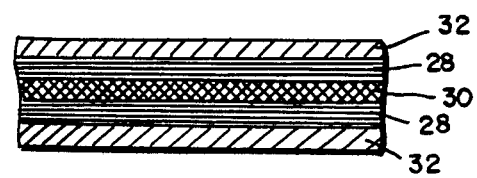
FIG. 5 is a fragmented sectional view, on an enlarged scale, through an alternate form of camouflage coated fabric in accordance with the present invention, incorporating a chemical-biological barrier film.

To that end and referring to FIGS. 4 and 5, FIG. 4 shows a known material, generally designated 22, according to the prior art for providing CB resistance to such material as fox hole covers. In this material, a tight or closed-weave base fabric 24 simply has a CB resistant barrier film 26 bonded thereto.

FIG. 5 shows a material in accordance with the present invention which incorporates a prefabricated CB resistant barrier film 28. The film is selected from a group of films which include nylon, polyethylene terephthalate, polyacrlonitrile, polyvinylidene chloride, polyvinyl fluoride, polyvinyl phioride, and the like. This material is readily applicable for bonding directly to a closed-weave based fabric 30, such as polyester or nylon. The selected barrier film material also is readily applicable for applying a thermoplastic camouflage coating 32 thereto by an appropriate laminating process.

Figure 6:
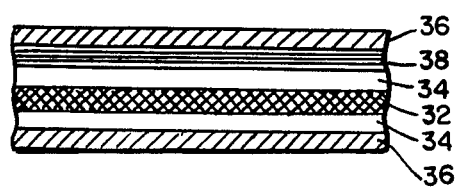
FIG. 6 is a fragmented sectional view, on an enlarged scale, through another form of camouflage coated fabric incorporating a chemical-biological barrier film.

FIG. 6 shows another embodiment of the invention which is readily applicable for use as cargo covers, or the like. In this embodiment, a base fabric 32 of a closed-weave construction has thermoplastic base coats 34 adhered thereto by a bonding agent. Top coats 36 of thermoplastic camouflage materials are laminated to the outside of the material. A CB barrier film 38 is sandwiched between at least one of the base coats 34 and one of the top coats 36. The barrier film is bonded to the adjacent base coat and the adjacent top camouflage coat is adhered thereto by an appropriate laminating process.

Thus, it can be seen that new laminated chemical and biological resistant, flexible fabrics or materials are provided by the present invention which not only are resistant to permeation of chemical agents but which can meet camouflage requirements.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:

1. A laminated chemical and biological resistant, flexible camouflage material comprising:
   a base fabric of woven construction forming a support layer for said material;
   a flexible base coat of polyvinyl chloride material laminated to at least one side of said base fabric; and
   a flexible top coat laminated to said base coat, said top coat having camouflage properties and comprising a chemical and biological resistant material selected from the group consisting of aliphatic polyurethanes, polyvinylidene chloride, butyl rubber, fluorocarbon polymers, nitrile rubber.

2. The laminated material of claim 1 wherein said base fabric comprises an open-weave construction and said base coat is adhered thereto by physically filling the interstices of the open-weave.

3. The laminated material of claim 1 wherein said base fabric comprises a closed-weave construction and said base coat includes a bonding agent for adhering the base coat to the base fabric.

4. A laminated chemical and biological resistant, flexible camouflage material comprising:
a base fabric of woven cloth construction forming a support layer for said material;
a flexible thermoplastic base coat of polyvinyl chloride material laminated to at least one side of said base fabric and adhered thereto; and
a flexible top camouflage coat material laminated to said base coat by an adhesive, said top coat comprising a chemical and biological resistant material selected from the group consisting of aliphatic polyurethanes, polyvinylidene chloride, butyl rubber, fluorocarbon polymers, nitrile rubber.

5. The laminated material of claim 4 wherein said base fabric comprises an open-weave construction and said base coat is adhered thereto by physically filling the interstices of the open-weave.

6. The laminated material of claim 4 wherein said base fabric comprises a closed-weave construction and said base coat includes a bonding agent for adhering the base coat to the base fabric.

7. The laminated material of claim 4 wherein a said base coat and a said top coat are laminated to both sides of said base fabric.

8. A process of fabricating a laminated chemical and biological resistant, flexible camouflage material comprising:
providing a support layer for said material in the form of a base fabric of woven construction;
applying to at least one side of said base fabric a flexible coat of polyvinyl chloride material; and
applying to said base coat a flexible top coat of chemical and biological resistant camouflage material, selected from the group consisting of aliphatic polyurethanes, polyvinylidene chloride, butyl rubber, fluorocarbon polymers, nitrile rubber.

9. The process of claim 8 wherein said base fabric is of an open-weave construction, and said step of applying said base coat comprises adhering a polyvinyl chloride material layer to the base fabric by filling the interstices thereof.

10. The process of claim 8 wherein said base fabric is of a closed-weave construction, and said step of applying said base coat comprises adhering the base coat to the base fabric by a bonding agent.

11. The process of claim 8 wherein a said base coat and a said top coat are applied to both sides of said base fabric.

12. A process of fabricating a laminated chemical and biological resistant, flexible camouflage material comprising:
providing a support layer for said material in the form of a base fabric of woven cloth construction;
applying to at least one side of said base fabric a flexible thermoplastic base coat of polyvinyl chloride material adhered to the base fabric; and
applying to said base coat a flexible top camouflage coat of chemical and biological resistant material adhered to said base coat by an adhesive, said top coat selected from the group consisting of aliphatic polyurethanes, polyvinylidene chloride, butyl rubber, fluorocarbon polymers, nitrile rubber.

13. The process of claim 12 wherein said base fabric is of an open-weave construction, and said base coat is adhered to said base fabric by filling the interstices thereof.

14. The process of claim 12 wherein said base fabric is of a closed-weave construction, and said step of applying said base coat comprises adhering the base coat to the base fabric by a bonding agent.

15. The process of claim 12 where a said base coat and a said top coat are applied to both sides of said base fabric.

16. The process of claim 12 wherein said base fabric comprises a woven polyester or nylon material.

17. A laminated chemical and biological resistant, flexible camouflage material comprising:
a basic fabric of closed-weave, woven construction forming a support layer for said material;
a chemical and biological resistant solid flexible barrier film bonded to at least one side of said base fabric, said barrier film consisting of nylon, polyethylene terephthalate, polyacrylonitrile and polyvinylidene chloride; and
a flexible top coat of polyvinyl chloride material laminated to said barrier film.

18. A laminated chemical and biological resistant, flexible camouflage material comprising:
a base fabric of closed-weave, woven construction forming a support layer for said material;
a flexible base coat of polyvinyl chloride material bonded to at least one side of said base fabric;
a chemical and biological resistant solid barrier film bonded to said base coat, said barrier film selected from the group consisting of nylon, polyetheylene terephthalate, and polyacrylonitrile and polyvinylidene chloride; and
a top coat of polyvinyl chloride material laminated to said barrier film.

* * * * *